US012759435B2

(12) United States Patent
Lin et al.

(10) Patent No.: US 12,759,435 B2
(45) Date of Patent: Oct. 13, 2026

(54) CHILD SAFETY SEAT WITH ROTATING MECHANISM

(71) Applicants: Jiangjuan Lin, Ningbo (CN); Huanle Xia, Ningbo (CN)

(72) Inventors: Jiangjuan Lin, Ningbo (CN); Huanle Xia, Ningbo (CN)

(73) Assignee: NINGBO WELLDON INFANT AND CHILD SAFETY TECHNOLOGY CO., LTD., Ningbo (CN)

( * ) Notice: Subject to any disclaimer, the term of this patent is extended or adjusted under 35 U.S.C. 154(b) by 159 days.

(21) Appl. No.: 18/805,580

(22) Filed: Aug. 15, 2024

(65) Prior Publication Data

US 2024/0399936 A1 Dec. 5, 2024

Related U.S. Application Data

(63) Continuation of application No. PCT/CN2023/076150, filed on Feb. 15, 2023.

(30) Foreign Application Priority Data

Feb. 16, 2022 (CN) ......................... 202210140659.1
Mar. 16, 2022 (CN) ......................... 202210255389.9

(51) Int. Cl.
*B60N 2/28* (2006.01)
*B60N 2/02* (2006.01)
(Continued)

(52) U.S. Cl.
CPC ....... *B60N 2/0256* (2023.08); *B60N 2/02253* (2023.08); *B60N 2/266* (2023.08);
(Continued)

(58) Field of Classification Search
CPC .. B60N 2/2869; B60N 2/2821; B60N 2/2824; B60N 2/2887
(Continued)

(56) References Cited

U.S. PATENT DOCUMENTS

2023/0014310 A1* 1/2023 Longenecker ....... B60N 2/2806
2024/0123874 A1* 4/2024 Kondrad ........... B60N 2/02246
(Continued)

FOREIGN PATENT DOCUMENTS

CN 104859493 A 8/2015
CN 204712908 U 10/2015
(Continued)

OTHER PUBLICATIONS

International Search Report for PCT Application No. PCT/CN2023/076150.

*Primary Examiner* — Alfred J Wujciak
(74) *Attorney, Agent, or Firm* — JEEN IP LAW, LLC

(57) ABSTRACT

According to a child safety seat with the rotating mechanism provided by the present invention, the seat body is driven to rotate 360 degrees through the toothed ring and the screw rod. The screw rod is more labor-saving and has a simpler structure. The turntable is fixed relative to the seat body. The locking member is arranged at a bottom of the seat body, and the positioning slot is arranged on the toothed ring, to fix the turntable and the toothed ring. By the arrangement of the plurality of positioning slots on the toothed ring and the arrangement of an unlocking switch configured to unlock the locking member and the positioning slots, the seat body can be manually rotated through the turntable, which is faster. By the arrangement of the sensor to sense whether the seat body is locked, the safety of use is improved.

9 Claims, 6 Drawing Sheets

(51) Int. Cl.
*B60N 2/26* (2006.01)
*B60N 2/90* (2018.01)

(52) U.S. Cl.
CPC ......... *B60N 2/2821* (2013.01); *B60N 2/2869* (2013.01); *B60N 2/919* (2018.02)

(58) Field of Classification Search
USPC ............................... 297/256.12, 253, 256.16
See application file for complete search history.

(56) References Cited

U.S. PATENT DOCUMENTS

| | | | | |
|---|---|---|---|---|
| 2024/0383382 | A1* | 11/2024 | Cheng | B60N 2/002 |
| 2026/0061902 | A1* | 3/2026 | Zhang | B60N 2/2821 |

FOREIGN PATENT DOCUMENTS

| | | | |
|---|---|---|---|
| CN | 109624803 | A | 4/2019 |
| CN | 110712572 | A | 1/2020 |
| CN | 110799380 | A | 2/2020 |
| CN | 210502386 | U | 5/2020 |
| CN | 113561861 | A | 10/2021 |
| CN | 114347883 | A | 4/2022 |
| CN | 114919474 | A | 8/2022 |
| DE | 102018211699 | A1 | 1/2020 |
| WO | 2023155800 | A1 | 8/2023 |

* cited by examiner

CHILD SAFETY SEAT WITH ROTATING MECHANISM

CROSS-REFERENCE TO RELATED APPLICATIONS

This application is a continuation of International Application No. PCT/CN2023/076150, filed on Feb. 15, 2023, the entire contents of which are incorporated herein by reference.

TECHNICAL FIELD

The present disclosure relates to the technical field of seats, and in particular, to a child safety seat with a rotating mechanism.

BACKGROUND OF THE INVENTION

An automotive child safety seat is a seat that is designed specifically for children of different ages, is mounted in a vehicle, and can effectively improve the safety of children on the vehicle. With the gradual improvement of the awareness of vehicle safety, the child safety seats have been widely used. However, the traditional child safety seats are fixedly mounted in vehicles. In actual use, due to different ages, different bodily forms, different sleep states, and different requirements for comfort levels of usage, the safety seat needs to be rotationally adjusted.

At present, there have been already some related technical solutions for the rotational adjustment of the child safety seats in the prior art. For example, the invention patent No. CN113561861A discloses a child safety seat capable of automatically adjusting a gear shift. Specifically, the child safety seat includes a base and a seat body; a rotary stepping motor and a rotary large gear plate capable of being rotationally supported are fixedly arranged on the seat body; the rotary stepping motor is connected to a rotary pinion; the rotary pinion forms a worm wheel and worm structure on an inner toothed ring of the rotary large gear plate. The rotary large gear plate supports a rotary plate seat; a feed stepping motor is arranged on the rotary plate seat through a fixed seat; the feed stepping motor drives a feed gear; the feed gear forms a worm wheel and worm structure to support a driving toothed plate arranged at a lower rear part of the seat body. In this technical solution, the rotary pinion forms the worm wheel and worm structure to drive the rotary large gear to rotate, thereby driving the seat body to rotate and adjust a gear shift through a guide wall column. However, the child safety seat of this structure can rotate only when two gears fully form the worm wheel and worm structure, so that a large mounting space is required. The child safety seat has a complex structure and is heavy. On the other hand, the entire driving device is mounted on the base and needs to bear the weight of the seat during the driving, which can easily damage the rotating mechanism.

From the content disclosed in the prior art, it can be seen that at present, in the child safety seat with an electric rotating function, an electric rotating mechanism occupies a large space and is heavy, so that the electric rotating mechanism cannot be rotated in place at a special position in a timely manner and is still inconvenient to use. Manual rotation wastes time and labor. There is still a problem of a large size of the rotating mechanism at present.

SUMMARY OF THE INVENTION

For the problems that the electric rotation of a child safety seat in the prior art is inconvenient to adjust and is difficult to lock, the present disclosure provides a child safety seat with a rotating mechanism. The child safety seat has the advantages of convenience of electric rotation, small size of an electric rotating mechanism, quick locking, and the like.

One concept of the present disclosure is to provide a child safety seat with a rotating mechanism, specifically including a seat body and a base. The seat body is mounted on the base; the base is provided with the rotating mechanism; and the rotating mechanism is configured to enable the seat body to rotate on the base.

Further, the rotating mechanism includes a turntable and a driving mechanism; the seat body is mounted on the turntable; a projection of the driving mechanism on a horizontal plane does not overlap a projection of the turntable on the horizontal plane; the driving mechanism includes a screw rod; the screw rod forms a worm wheel and worm structure together with the turntable; and the driving mechanism drives the turntable to rotate through the screw rod.

Still further, a toothed ring is arranged between the turntable and the screw rod; the toothed ring forms a worm wheel and worm structure together with the screw rod; and the driving mechanism is arranged on the base.

In this technical solution, as the toothed ring is arranged on the turntable, the driving mechanism is used to drive the toothed ring, to drive the turntable to rotate, and the seat body is driven by the turntable to rotate. The toothed ring enables the seat body to rotate 360 degrees, which can meet various use needs. The driving mechanism is arranged on the base, and the screw rod forms the worm wheel and worm structure together with the toothed ring, so that the toothed ring is driven by the screw rod to rotate. Compared with two-gear meshing driving in the prior art, the screw rod has a small size, and the driving mechanism occupies a smaller space, so that the size of the child safety seat is greatly reduced. In another aspect, the projection of the driving mechanism on the horizontal plane does not overlap the projection of the turntable on the horizontal plane, so that the driving mechanism drives the seat body to rotate from a side surface. This can reduce the height of the child seat and improve the stability.

Still further, the driving mechanism includes a motor; the motor is configured to drive the screw rod; an axis of the screw rod is parallel to an axis of the output shaft of the motor.

In this technical solution, the screw rod is parallel to the output shaft of the motor, so that the size of the entire driving mechanism is small, and assembling of the driving mechanism does not affect the size of the entire seat. In addition, the screw rod and the motor form the overall modularized driving mechanism, which is convenient for mounting, and is more convenient for removal and maintenance when the driving mechanism fails.

Still further, a speed reduction mechanism is arranged between the output shaft of the motor and the screw rod, and the speed reduction mechanism is configured to increase a torque.

The speed reduction mechanism is preferably a gear set.

In an actual use process, a large torque is required when the toothed ring is driven to drive the seat body to rotate. In this technical solution, since the speed reduction mechanism, such as a gear set, is arranged between the output shaft of the motor and the screw rod, the torque of the screw rod is greatly increased, and the low-power motor can drive the screw rod and the toothed ring. This can reduce the cost and can further reduce the size.

Still further, the motor is a direct-current motor.

The present disclosure can further provide a child safety seat with a rotating mechanism, specifically including a seat body and a base. The seat body is mounted on the base; the base is provided with the rotating mechanism; and the rotating mechanism is configured to enable the seat body to rotate on the base.

Further, the rotating mechanism includes a turntable and a driving mechanism; the seat body is mounted on the turntable; a projection of the driving mechanism on a horizontal plane does not overlap a projection of the turntable on the horizontal plane; the turntable is provided with a toothed ring; the driving mechanism is configured to drive the toothed ring to drive the turntable to rotate; the driving mechanism is arranged on the base;

the seat body is provided with a locking member and an unlocking switch; the locking member is configured to lock the turntable and the toothed ring; and the unlocking switch is configured to control the locking member to be unlocked.

Still further, the toothed ring is provided with at least two positioning slots; and the positioning slots are configured to cooperate with the locking member for locking.

In this technical solution, the seat body enters the positioning slots through the locking member, and the locking member locks the turntable and the toothed ring in the positioning slots, so that the turntable can drive the seat body when driven by the driving mechanism. The seat body is mounted on the base through the locking member and the positioning slots, and the stability of connection between the seat body and the base is higher.

Still further, another concept of the present disclosure is that the turntable is provided with a sensor; the sensor is configured to sense a state of the locking member; and if the sensor detects that the locking member is unlocked, the driving mechanism is controlled to be unable to start.

Still further, the unlocking switch is arranged on two sides of the seat body.

Still further, the driving mechanism includes a screw rod; the screw rod forms a worm wheel and worm structure together with the toothed ring; the driving mechanism drives the turntable to rotate through the screw rod; the driving mechanism includes a motor; the motor is configured to drive the screw rod; an axis of the screw rod is parallel to an axis of an output shaft of the motor; a speed reduction mechanism is arranged between the output shaft of the motor and the screw rod; and the speed reduction mechanism is configured to increase a torque.

To consider the safety, electric rotation is often at a slow speed. When rapid rotation is needed, in this technical solution, the turntable can be connected to the toothed ring through the locking member and the positioning slots. Then, by the arrangement of the unlocking switch for unlocking, the turntable can rotate relative to the toothed ring, and the seat body can rotate through the turntable. Through the unlocking switch and the positioning slots, adjustment of the rapid rotation can be achieved. By the arrangement of the plurality of positioning slots on the toothed ring, the unlocking switch can lock different positioning slots to change the rotation position of the seat body. By the arrangement of the positioning slots in several commonly used rotation positions of the seat, such as a position facing a vehicle door, the child seat is quickly rotated manually to meet more use needs.

In another aspect, during manual rotation, if the driving mechanism is still in a working state, a danger may occur. In this technical solution, the sensor configured to sense the locking member is provided. When the sensor senses that the locking member is unlocked, namely, when the turntable and the toothed ring are in an unlocked state, the sensor transmits a signal to control the motor to be unable to start, thereby preventing personal injury caused by the start of the motor and greatly improving the safety of rotation of the seat.

The present disclosure can further provide a child safety seat with a rotating mechanism, specifically including a seat body and a base. The seat body is mounted on the base; the base is provided with the rotating mechanism; and the rotating mechanism is configured to enable the seat body to rotate on the base.

Further, the rotating mechanism includes a turntable and a driving mechanism; the seat body is mounted on the turntable; a projection of the driving mechanism on a horizontal plane does not overlap a projection of the turntable on the horizontal plane; the turntable is provided with a toothed ring; the driving mechanism is configured to drive the toothed ring to drive the turntable to rotate; the driving mechanism is arranged on the base;

the seat body is provided with a first sensing device; and the first sensing device is configured to sense opening of a vehicle door and control the seat body to automatically turn to the opened vehicle door.

In an actual use process, the child safety seat is fixed on an adult seat of a vehicle. Most child safety seats in the prior art are fixed and cannot be rotated, so that a space for a child is limited, and it is very inconvenient. In this technical solution, the rotating mechanism is arranged on the base, so that the seat body can rotate 360 degrees on the base through the rotating mechanism. Furthermore, the first sensing device configured to sense a vehicle door is arranged on the seat body. When the vehicle door is opened, the seat body rotates towards the opened vehicle door through the first sensing device, so that it is convenient to put a child on the seat, and the child safety seat is convenient to use.

Still further, the seat body is provided with a second sensing device; the second sensing device is configured to sense an empty state of the seat body; and if the second sensing device detects that there is a child on the seat body, the rotating mechanism is controlled to be powered off.

The child safety seat provided in this technical solution can automatically turn to the opened vehicle door through the first sensing device. When the child needs to get off the vehicle, if the vehicle door is opened, the automatic rotation of the seat may accidentally injure the child. Thus, in this technical solution, the second sensing device is configured to detect whether there is a child on the seat body. When it is detected that the seat body is empty, the seat body can automatically turn. When the second sensing device detects that there is a child on the seat body, the rotating mechanism is powered off, and the seat body cannot automatically rotate to ensure the safety of the child.

Still further, the seat body is provided with a connecting module; the connecting module is configured to connect an in-vehicle main control system; the in-vehicle main control system transmits a vehicle door opening signal to the seat body through the connecting module; and the seat body automatically turns to the automobile door on the closer side after receiving the signal.

In this technical solution, the connecting module is arranged on the seat body, so that the seat body can be connected to the in-vehicle main control system through the connecting module. When the vehicle door is switched to an unlocked state, the in-vehicle main control system can transmit the signal to the seat body through the connecting module, and the seat body can receive the vehicle door opening signal, so that the seat body automatically turns to the vehicle door on the side closer to the seat body through the rotating mechanism, to facilitate putting the child.

Still further, the driving mechanism is arranged on the base; the driving mechanism includes a screw rod; the screw rod forms a worm wheel and worm structure together with the toothed ring; the driving mechanism drives the turntable to rotate through the screw rod; the driving mechanism includes a motor; the motor is configured to drive the screw rod; an axis of the screw rod is parallel to an axis of an output shaft of the motor; a speed reduction mechanism is arranged between the output shaft of the motor and the screw rod; and the speed reduction mechanism is configured to increase a torque.

Still further, the seat body is provided with a locking member and an unlocking switch; the locking member is configured to lock the turntable and the toothed ring; the unlocking switch is configured to control the locking member to be unlocked; the toothed ring is provided with at least two positioning slots; the positioning slots are configured to cooperate with the locking member for locking; the turntable is provided with a sensor; the sensor is configured to sense a state of the locking member; if the sensor detects that the locking member is unlocked, the driving mechanism is controlled to be unable to start; and the unlocking switch is arranged on two sides of the seat body.

According to the child safety seat with the rotating mechanism provided by the present disclosure, the seat body is driven to rotate 360 degrees through the toothed ring and the screw rod. The screw rod is more labor-saving and has a simpler structure. The turntable is fixed relative to the seat body. The locking member is arranged at a bottom of the seat body, and the positioning slot is arranged on the toothed ring, to fix the turntable and the toothed ring. By the arrangement of the plurality of positioning slots on the toothed ring and the arrangement of an unlocking switch configured to unlock the locking member and the positioning slots, the seat body can be manually rotated through the turntable, which is faster. By the arrangement of the sensor to sense whether the seat body is locked, the safety of use is improved. The child safety seat with the rotating mechanism provided by the present disclosure has the advantages of convenience of electric rotation, small size of an electric rotating mechanism, quick locking, and the like.

BRIEF DESCRIPTION OF DRAWINGS

The present disclosure is further described below in detail in combination with the accompanying drawings and embodiments. These drawings are not necessarily drawn to scale. It should be understood that these drawings only describe some implementation modes of the present disclosure, and should not be regarded as limiting the scope of the present disclosure.

DETAILED DESCRIPTION OF THE INVENTION

The present disclosure will be explained in detail below in conjunction with the accompanying drawings 1 to 6.

In order to make the aims, technical solution and advantages of the present disclosure will be clearly, the present disclosure is further described below in combination with accompanying drawings and implementations. It should be understood that the specific embodiments described herein are intended only to explain the present disclosure and are not intended to define the present disclosure.

Embodiment 1

Figure 1:
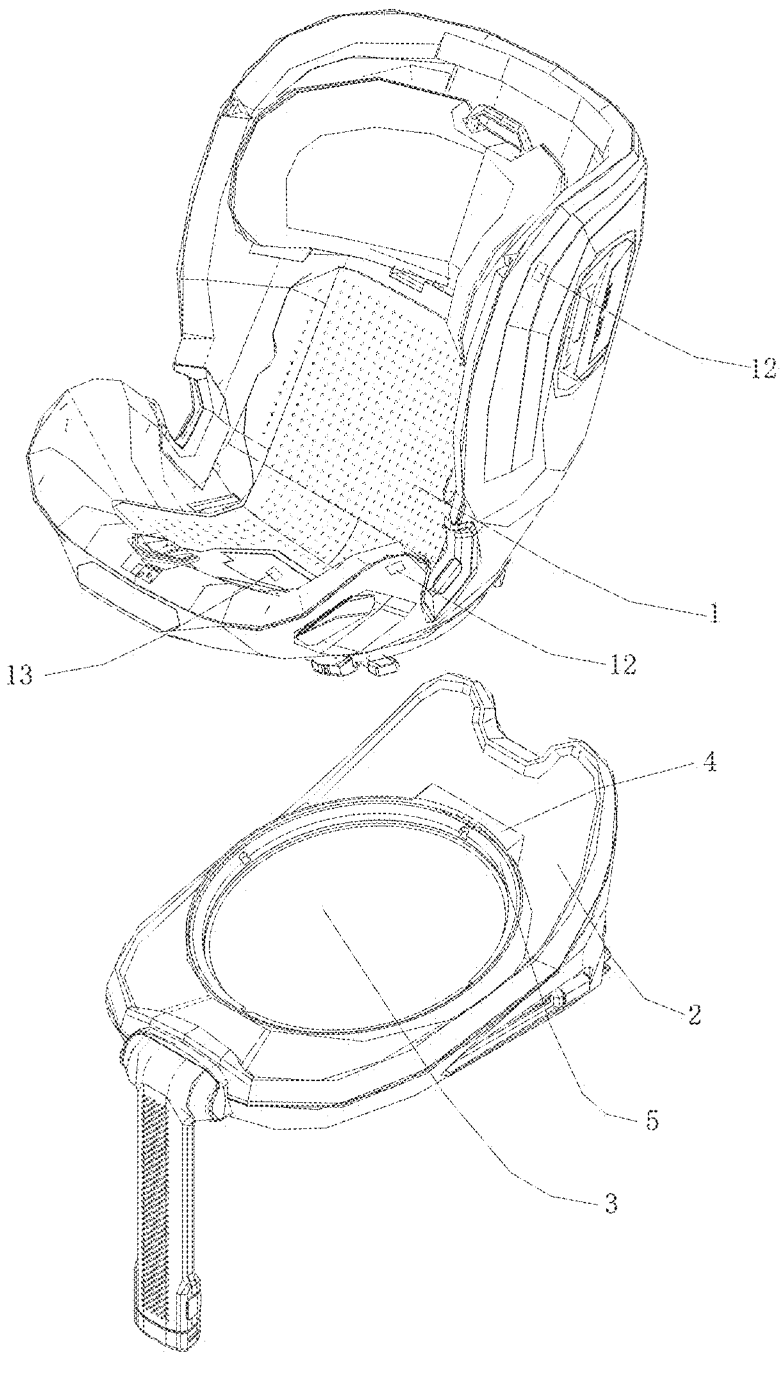
FIG. 1 is an exploded view of a child safety seat with a rotating mechanism according to the present disclosure.
Figure 2:
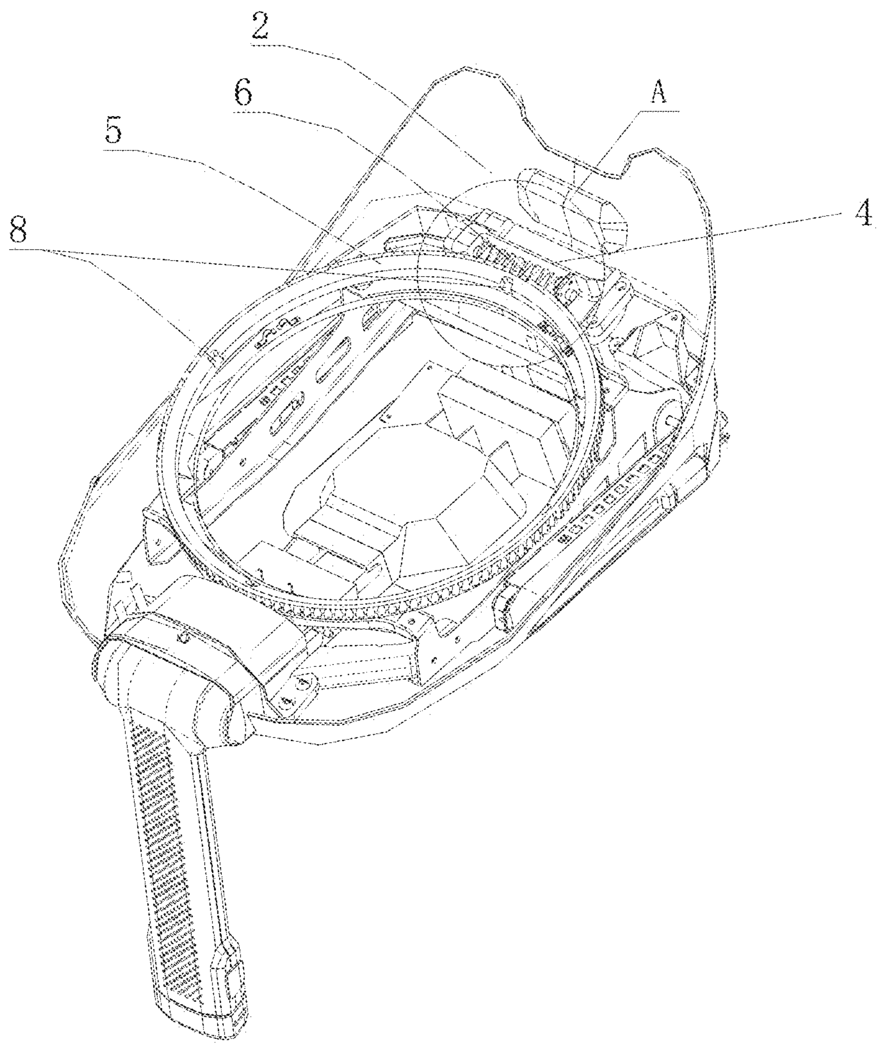
FIG. 2 is a partially structural diagram of a base according to the present disclosure.

As shown in FIG. 1 and FIG. 2, this embodiment provides a child safety seat with a rotating mechanism, specifically including a seat body 1 and a base 2. The seat body 1 is mounted on the base 2. The base 2 is provided with the rotating mechanism. The seat body 1 rotates on the base 2 through the rotating mechanism. The rotating mechanism includes a turntable 3 and a driving mechanism 4. The seat body 1 is mounted on the turntable 3. A projection of the driving mechanism on the horizontal plane does not overlap a projection of the turntable 3 on the horizontal plane. The seat body 1 is buckled to the turntable 3. The turntable 3 is provided with a toothed ring 5. The toothed ring 5 is slightly higher than the turntable 3, so that a limiting effect can be achieved during the mounting of the seat body 1, making the mounting more convenient. Furthermore, the toothed ring 5 is less affected by the weight of the seat body 1 itself. The driving mechanism 4 is configured to drive the toothed ring 5, thereby driving the turntable 3 to rotate. The toothed ring 5 enables the seat body 1 to rotate 360 degrees. The driving mechanism 4 is arranged on the base 2, which drives the seat body 1 to rotate laterally, thereby saving labor and energy and reducing the height. In addition, the child safety seat is hard to damage.

Figure 3:
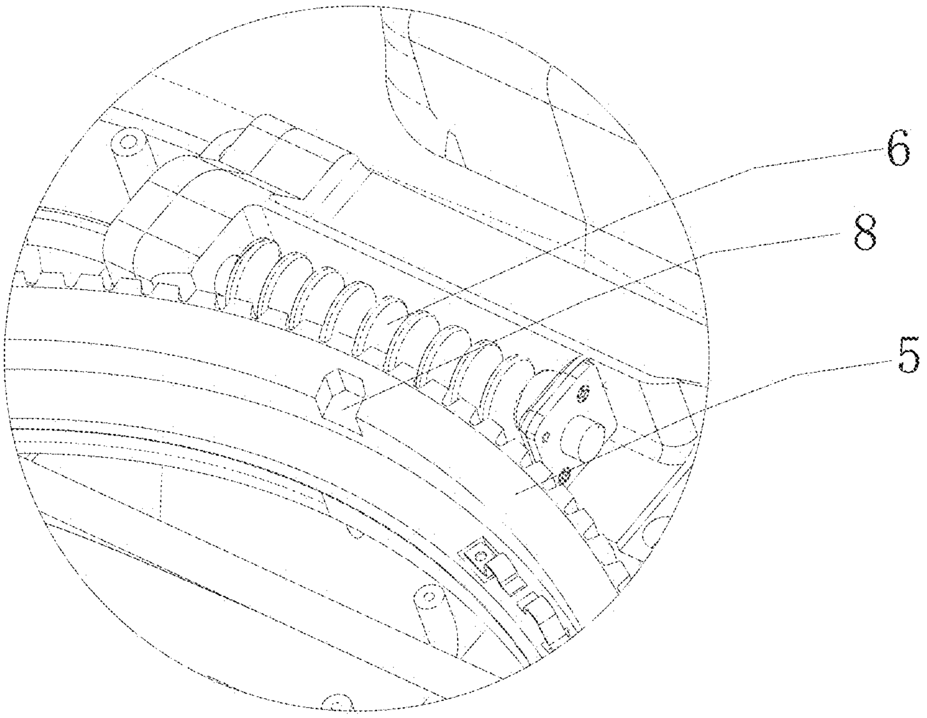
FIG. 3 is an enlarged diagram of A in FIG. 2 according to the present disclosure.
Figure 4:
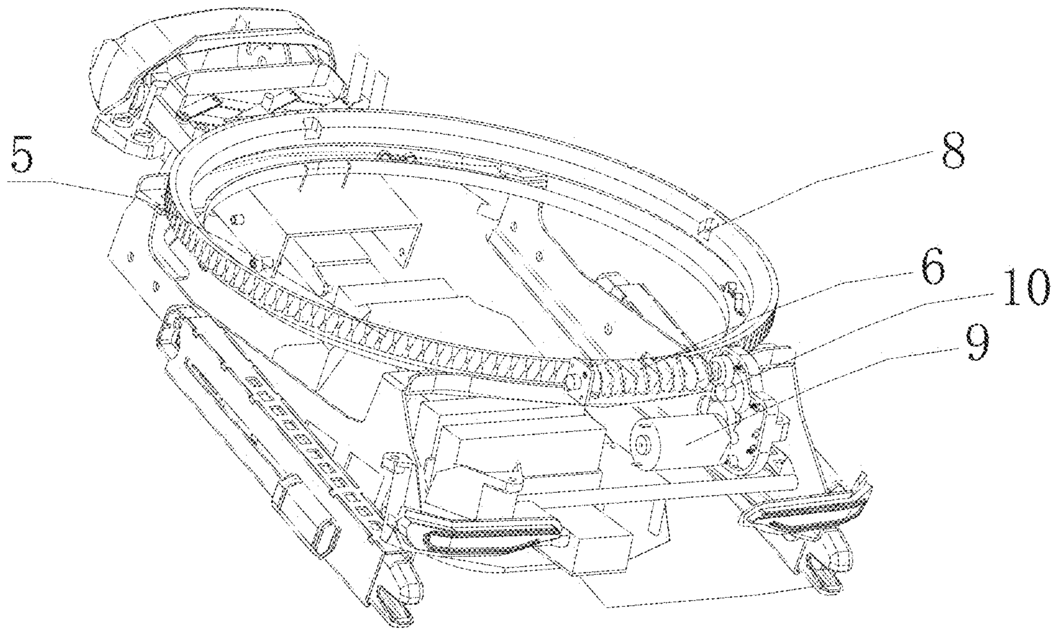
FIG. 4 is another partially structural diagram of a base according to the present disclosure.

Further, as shown in FIG. 3 and FIG. 4, the driving mechanism 4 includes a screw rod 6 and a motor 9 (in this embodiment, the motor 9 can be a direct current motor). The screw rod 6 forms a worm wheel and worm structure with the toothed ring 5. The driving mechanism 4 drives the screw rod 6 through the motor 9, so that the screw rod 6 drives the turntable 3 and the seat body 1 fixed on the turntable 3 to rotate. The screw rod 6 has a small size and a simple structure. An output shaft of the motor 9 is parallel to an axis of the screw rod 6, thereby reducing the size of the driving mechanism 4. Furthermore, the driving mechanism 4 is of an integrated structure, making the mounting and removal more convenient. A speed reduction mechanism 10 is mounted between the motor 9 and the screw rod 6. The speed reduction mechanism 10 is a gear set, and the motor 9 drives the screw rod 6 through the gear set, thereby greatly increasing the torque and saving the cost. During use, since the screw rod 6 and the toothed ring 5 form the worm wheel and worm structure, when the driving mechanism 4 is in a non-working state, the toothed ring 5 is locked under the action of the screw rod 6, and the seat body 1 will not rotate, thereby eliminating the locking mechanism. The child safety seat is more convenient to use, and the cost is reduced.

In another aspect, in this embodiment, the projection of the driving mechanism on the horizontal plane does not overlap the projection of the turntable 3 on the horizontal plane, so that the motor 9 can be arranged on an outer side surface of the turntable 3. The turntable 3 can be provided with external teeth which are easier to form and has better driving efficiency. When the driving mechanism needs to be maintained in the later stage, it is not necessary to disassemble the entire seat body, and the driving mechanism can be maintained and replaced by disassembling a base shell. Therefore, it is easier for later maintenance and service, and the maintenance cost is lower. Moreover, due to the lateral driving, the existing commonly used and manually adjusted rotating mechanism can be retained, and a ball-head pushing pillar required for electric adjustment in the prior art is eliminated, so that the overall height of the rotating mechanism is reduced, the cost of renovation and upgrading is lower, and the production is more convenient.

Embodiment 2

As shown in FIG. 1 to FIG. 6, this embodiment provides a child safety seat with a rotating mechanism based on Embodiment 1. This embodiment includes the electric rotating mechanism of Embodiment 1 and can further achieve manual rotation adjustment.

Figure 5:
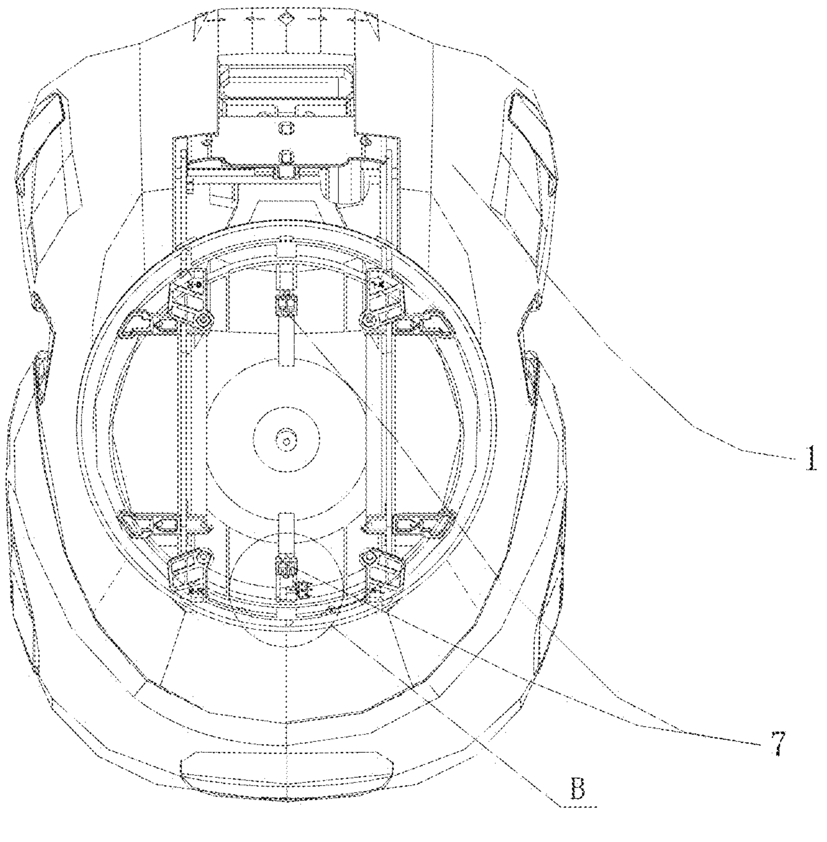
FIG. 5 is a top view of a seat body according to the present disclosure.
Figure 6:
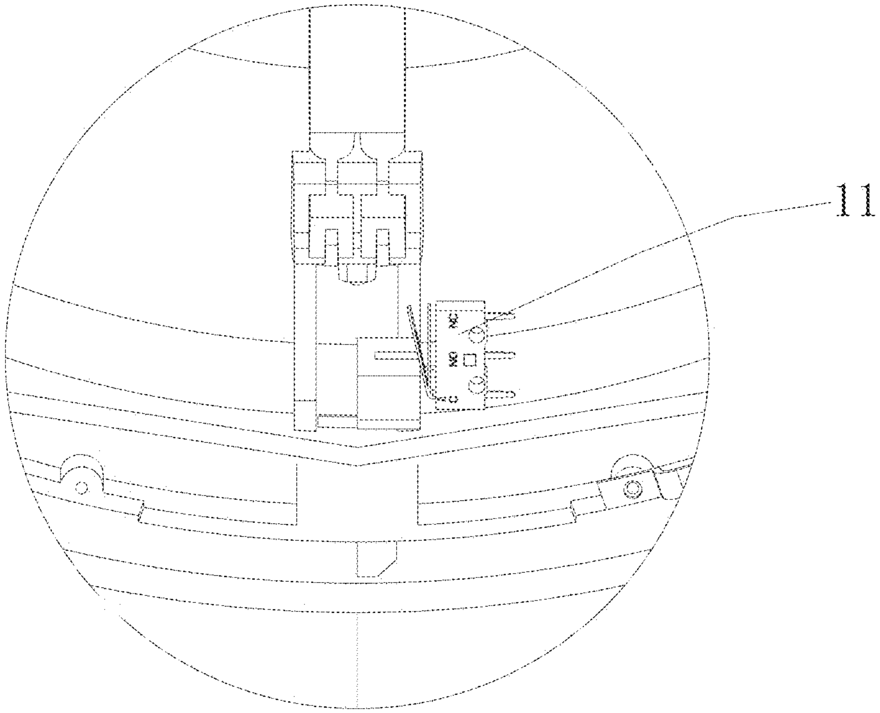
FIG. 6 is an enlarged diagram of B in FIG. 5 according to the present disclosure.

As shown in FIG. 5 and FIG. 6, a locking member 7 is arranged at a bottom of the seat body 1; the locking member 7 is configured to lock the turntable 3 and the toothed ring 5. As shown in FIG. 2, the toothed ring 5 is provided with a positioning slot 8. The positioning slot 8 is configured to cooperate with the locking member 7 for locking. In this embodiment, by the arrangement of the locking member 7 and the positioning slot 8, the toothed ring 5 and the turntable 3 can rotate or be fixed relative to each other. The locking member 7 is a locking pin. One locking pin is arranged at the bottom of the seat body 1 or two locking pins are symmetrically arranged at the bottom of the seat body 1 (in this embodiment, there is one or two or more locking pins), and there is one or two positioning slots 8 corresponding to the locking pins. The locking member 7 enters the positioning slot 8 to fix the turntable 3 and the toothed ring 5.

Further, the seat body 1 is provided with an unlocking switch. The unlocking switch is configured to control the locking pin to be unlocked. The turntable 3 and the toothed ring 5 are in a non-locked state, and the toothed ring 5 cannot rotate under the action of the screw rod 6. The turntable 3 can rotate relative to the toothed ring 5, so that the seat body 1 can rotate through the turntable 3. By the arrangement of two or more groups of positioning slots 8 (each group including two positioning slots) configured to accommodate the two symmetric locking pins at the bottom of the seat body 1, the seat body 1 can be locked at various rotation positions. Compared with electric rotation, manual rotation is quicker, and the manual and electric integrated design can meet more use needs.

Still further, as shown in FIG. 6, the turntable 3 is provided with a sensor 11. The sensor 11 is arranged at a position close to the locking pin to sense a state of the locking pin. After the locking pin is unlocked, the sensor 11 will be touched, and the sensor 11 detects that the locking pin is unlocked, so that the motor 9 is powered off and cannot start. This ensures that the electric rotating mechanism is powered off during manual adjustment, and the safety of use of the device is improved.

Still further, the base is provided with a locator. The locator is configured to sense position information of the seat body. The locator can be achieved by sensing a rotation angle or by touch sensing. The locator can sense at least four rotation positions, and every two adjacent rotation positions form 90 degrees. By the arrangement of the locator for sensing at each rotation position, it is more convenient to sense commonly used rotation positions.

Embodiment 3

This embodiment provides a child safety seat with a rotating mechanism based on Embodiment 1 or Embodiment 2. The seat body 1 is provided with first sensing devices 12. The first sensing devices 12 are configured to sense opening of a vehicle door. When the vehicle door is opened, the rotating mechanism controls, through the first sensing devices 12, the seat body 1 to turn to the opened vehicle door. The first sensing devices 12 are laser radars. The laser radars are mounted on two sides of the seat body. The laser radars have small sizes. After being mounted, the laser radars will not affect the size of the entire seat. The first sensing devices 12 are symmetrically mounted on two sides of the seat body and close to the vehicle door. There may be four first sensing devices 12 which are respectively mounted in four directions: up, down, left, and right, to improve the sensing precision.

Further, the seat body 1 is provided with a second sensing device 13 to sense an empty state of the seat body 1. When it is detected that the seat body 1 is empty, the seat body 1 can automatically turn. When the second sensing device 13 detects that there is a child on the seat body 1, the rotating mechanism is powered off, and the seat body 1 cannot rotate automatically. The second sensor is a pressure sensor, and the pressure sensor is mounted at a sitting position of the seat body 1 or on the turntable 3 of the base 2.

Still further, the connecting module is arranged on the seat body 1, so that the seat body 1 can be connected to the in-vehicle main control system through the connecting module. When the vehicle door is switched to an unlocked state, the in-vehicle main control system can transmit a signal to the seat body 1 through the connecting module, and the seat body 1 can receive a vehicle door opening signal, so that the seat body automatically turns to the vehicle door on the side closer to the seat body 1 through the rotating mechanism, to facilitate putting the child. On the other hand, the child safety seat can be connected to another signal end through the connecting module, such as a mobile phone APP. Through the APP, the seat body 1 can be directly controlled to turn. The child safety seat is more convenient to use.

According to the child safety seat with the rotating mechanism provided by the present disclosure, the seat body 1 is driven to rotate 360 degrees through the toothed ring 5 and the screw rod 6. The screw rod 6 is more labor-saving and has a simpler structure. The turntable 3 is fixed relative to the seat body 1. The locking member 7 is arranged at a bottom of the seat body 1, and the positioning slot 8 is arranged on the toothed ring 5, to fix the turntable 3 and the toothed ring 5. By the arrangement of the plurality of positioning slots 8 on the toothed ring 5 and the arrangement of an unlocking switch configured to unlock the locking member 7 and the positioning slots 8, the seat body 1 can be manually rotated through the turntable 3, which is faster. By the arrangement of the sensor to sense whether the seat body 1 is locked, the safety of use is improved. The child safety seat with the rotating mechanism provided by the present disclosure has the advantages of convenience of electric rotation, small size of an electric rotating mechanism, quick locking, and the like.

The terms used in part of the implementations of the present disclosure are only used for explaining the specific embodiments of the present disclosure, but are not intended to limit the present disclosure. The implementation modes of the present disclosure are described above only. It should be noted that those of ordinary skill in the art can further make improvements without departing from the concept of the present disclosure. These improvements shall all fall within the protection scope of the present disclosure.

The invention claimed is:

1. A child safety seat with a rotating mechanism, comprising a seat body and a base, wherein the seat body is mounted on the base; the base is provided with the rotating mechanism; the rotating mechanism is configured to enable the seat body to rotate on the base;

the rotating mechanism comprises a turntable and a driving mechanism; the seat body is mounted on the turntable; a projection of the driving mechanism on a horizontal plane does not overlap a projection of the turntable on the horizontal plane; the turntable is provided with a toothed ring; the driving mechanism is configured to drive the toothed ring to drive the turntable to rotate; the driving mechanism is arranged on the base;

the seat body is provided with a locking member and an unlocking switch; the locking member is configured to lock the turntable and the toothed ring; the unlocking switch is configured to control the locking member to be unlocked; the turntable is provided with a sensor; the sensor is configured to sense a state of the locking member; and if the sensor detects that the locking member is unlocked, the driving mechanism is controlled to be unable to start rotating the seat body.

2. The child safety seat with the rotating mechanism according to claim 1, wherein the toothed ring is provided with at least two positioning slots; and the positioning slots are configured to cooperate with the locking member for locking.

3. The child safety seat with the rotating mechanism according to claim 1, wherein the unlocking switch is arranged on two sides of the seat body.

4. The child safety seat with the rotating mechanism according to claim 1, wherein the driving mechanism comprises a screw rod; the screw rod forms a worm wheel and worm structure together with the toothed ring; and the driving mechanism drives the turntable to rotate through the screw rod.

5. The child safety seat with the rotating mechanism according to claim 1, wherein the driving mechanism comprises a motor; the motor is configured to drive the screw rod; an axis of the screw rod is parallel to an axis of an output shaft of the motor; a speed reduction mechanism is arranged between the output shaft of the motor and the screw rod; and the speed reduction mechanism is configured to increase a torque.

6. A child safety seat with a rotating mechanism, comprising a seat body and a base, wherein the seat body is mounted on the base; the base is provided with the rotating mechanism; the rotating mechanism is configured to enable the seat body to rotate on the base;

the seat body is provided with a first sensing device; the first sensing device is configured to sense opening of a vehicle door and control the rotating mechanism to automatically turn the seat body to the opened vehicle door; the seat body is provided with a second sensing device; the second sensing device is configured to sense an empty state of the seat body; and if the second sensing device detects that there is a child on the seat body, the rotating mechanism is controlled to be powered off to prevent rotating the seat body.

7. The child safety seat with the rotating mechanism according to claim 6, wherein the seat body is provided with a connecting module; the connecting module is configured to connect an in-vehicle main control system; the connecting module transmits a vehicle door opening signal to the seat body; and the seat body automatically turns to the automobile door on the closer side after receiving the signal.

8. The child safety seat with the rotating mechanism according to claim 6, wherein the driving mechanism is arranged on the base; the driving mechanism comprises a screw rod; the screw rod forms a worm wheel and worm structure together with the toothed ring; the driving mechanism drives the turntable to rotate through the screw rod; the driving mechanism comprises a motor; the motor is configured to drive the screw rod; an axis of the screw rod is parallel to an axis of an output shaft of the motor; a speed reduction mechanism is arranged between the output shaft of the motor and the screw rod; and the speed reduction mechanism is configured to increase a torque.

9. The child safety seat with the rotating mechanism according to claim 6, wherein the seat body is provided with a locking member and an unlocking switch; the locking member is configured to lock the turntable and the toothed ring; the unlocking switch is configured to control the locking member to be unlocked; the toothed ring is provided with at least two positioning slots; the positioning slots are configured to cooperate with the locking member for locking; the turntable is provided with a sensor; the sensor is configured to sense a state of the locking member; if the sensor detects that the locking member is unlocked, the driving mechanism is controlled to be unable to start; and the unlocking switch is arranged on two sides of the seat body.

* * * * *